US012594779B2

(12) United States Patent
Shimizu et al.

(10) Patent No.: US 12,594,779 B2
(45) Date of Patent: Apr. 7, 2026

(54) ADHESIVE REMOVING DEVICE AND RECORDING DEVICE

(71) Applicant: SEIKO EPSON CORPORATION, Tokyo (JP)

(72) Inventors: Sho Shimizu, Matsumoto (JP); Yusuke Yamazaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 200 days.

(21) Appl. No.: 18/502,797

(22) Filed: Nov. 6, 2023

(65) Prior Publication Data

US 2024/0149597 A1 May 9, 2024

(30) Foreign Application Priority Data

Nov. 7, 2022 (JP) ................................ 2022-178117

(51) Int. Cl.
*B41J 29/17* (2006.01)
*B41J 11/00* (2006.01)

(52) U.S. Cl.
CPC ............ *B41J 29/17* (2013.01); *B41J 11/007* (2013.01)

(58) Field of Classification Search
CPC ... B41J 11/007; B41J 29/17; B41J 2/01; B41J 15/048; B41J 29/38; B41J 13/08; B41J 15/04; B41J 2/16538; B41J 2/16535; B08B 1/165; B08B 1/20; B08B 1/16
USPC .............................. 347/22, 32, 33, 101, 104
See application file for complete search history.

(56) References Cited

U.S. PATENT DOCUMENTS

2015/0153684 A1* 6/2015 Ishizuka ................. B41J 29/17 399/101
2021/0283908 A1* 9/2021 Tsubamoto .............. B41J 11/04
2023/0123189 A1* 4/2023 Baba ...................... B41J 13/106 347/101

FOREIGN PATENT DOCUMENTS

JP 2021-109736 A 8/2021

* cited by examiner

*Primary Examiner* — Jannelle M Lebron
(74) *Attorney, Agent, or Firm* — WORKMAN NYDEGGER

(57) ABSTRACT

An adhesive removing device includes a scraping member scraping an adhesive layer adhering to a front surface of a belt transporting a medium being a transport target object, and a support portion supporting the scraping member. The support portion supports the scraping member such that a support state of the scraping member is changeable. For example, the support portion supports a different type of scraping member in a replaceable manner.

8 Claims, 9 Drawing Sheets

ADHESIVE REMOVING DEVICE AND RECORDING DEVICE

The present application is based on, and claims priority from JP Application Serial Number 2022-178117, filed Nov. 7, 2022, the disclosure of which is hereby incorporated by reference herein in its entirety.

BACKGROUND

1. Technical Field

The present disclosure relates to an adhesive removing device and a recording device.

2. Related Art

An example of this type of device is disclosed in JP-A-2021-109736. JP-A-2021-109736 discloses an adhesive layer removing device in which when an adhesive force of an adhesive layer adhering to a front surface of an endless belt that rotates is reduced, an adhesive layer is formed again. It is described that the adhesive layer removing device includes a solvent applying unit that applies a solvent that dissolves the adhesive layer having a reduced adhesive force in order to efficiently remove the adhesive layer, a swelling promoting unit that promotes swelling of the adhesive layer through permeation of the solvent, and a scraper that scrapes the dissolved adhesive layer.

However, a scraper for scraping an adhesive is different in required scraping performance such as appropriate rigidity according to the type and the deterioration state of the adhesive, but the adhesive layer removing device of JP-A-2021-109736 cannot structurally cope therewith. Thus, it has been difficult to efficiently remove the adhesive.

SUMMARY

To solve the above problem, an adhesive removing device according to the present disclosure includes a scraping member configured to scrape an adhesive layer adhering to a front surface of a belt configured to transport a transport target object, and a support portion configured to support the scraping member, the support portion being configured to support the scraping member such that a support state of the scraping member is changeable.

Moreover, a recording device according to the present disclosure includes a belt including a front surface to which an adhesive layer adheres, the belt being configured to transport a medium, a recording unit configured to perform recording on the medium transported by the belt, and an adhesive removing device configured to remove the adhesive layer from the front surface of the belt, wherein the adhesive removing device is the adhesive removing device according to any one of first to eighth aspects described below.

DESCRIPTION OF EMBODIMENTS

Figure 1:
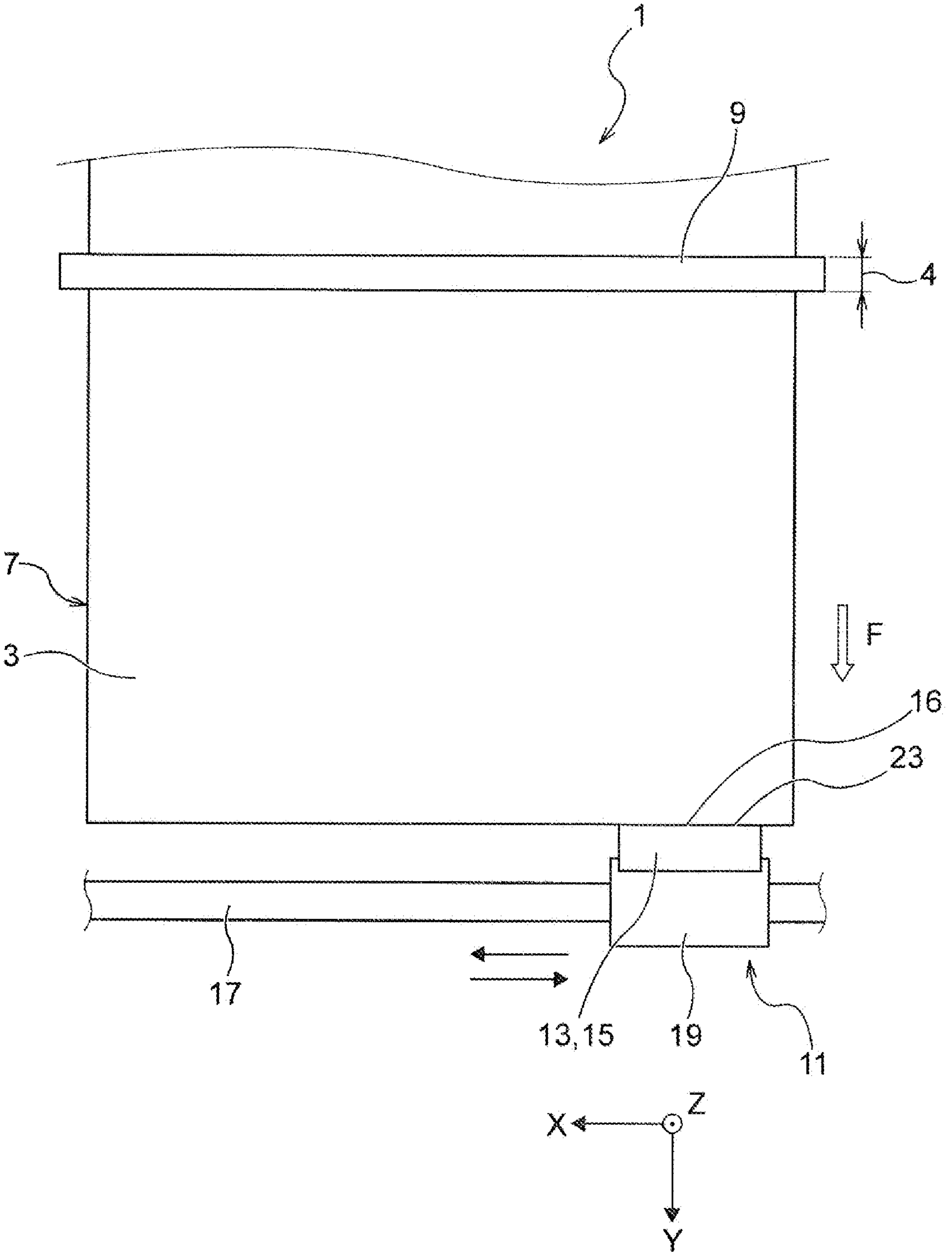
FIG. 1 is a schematic plan view of main parts of a recording device including an adhesive removing device according to a first embodiment.

Hereinafter, the present disclosure will be schematically described first.

To solve the above problem, an adhesive removing device according to a first aspect of the present disclosure includes a scraping member configured to scrape an adhesive layer adhering to a front surface of a belt configured to transport a transport target object, and a support portion configured to support the scraping member, the support portion being configured to support the scraping member such that a support state of the scraping member is changeable.

Here, the expression "scrape an adhesive layer" means that the belt moves in a transport direction relative to the scraping member in a state in which the scraping member is in contact with the adhesive layer adhering to the front surface of the belt, so that the adhesive layer is removed so as to be scraped off the front surface of the belt.

According to this aspect, the support portion that supports the scraping member supports the scraping member such that the support state of the scraping member is changeable. Accordingly, since the support state of the scraping member can be changed, the change can be performed according to the type of the adhesive and the deterioration state of the adhesive layer, and thus the adhesive layer can be scraped with efficient scraping performance.

An adhesive removing device according to a second aspect of the present disclosure is the adhesive removing device according to the first aspect, wherein the support portion is configured to support different types of the scraping members in a replaceable manner.

According to this aspect, the support portion supports the different type of the scraping member in a replaceable manner. This can easily change the support state of the scraping member by replacing the scraping member with the different type of the scraping member.

An adhesive removing device according to a third aspect of the present disclosure is the adhesive removing device according to the second aspect, wherein the scraping member is a scraper having a plate shape, and the adhesive removing device includes a curve forming portion configured to curve the scraper when the scraper is supported by the support portion.

According to this aspect, the curve forming portion curves the plate-shaped scraper having low rigidity, which can easily increase the rigidity of the scraper. Thus, the scraper, which has low rigidity in a non-curved state, is curved to have increased rigidity, and thus the scraper can be pressed against and come into firm contact with the belt. Accordingly, the adhesive layer can be scraped in a state in which the belt is less likely to be damaged.

An adhesive removing device according to a fourth aspect of the present disclosure is the adhesive removing device according to the third aspect, wherein the curve forming portion includes a plurality of members.

According to this aspect, since the curve forming portion includes the plurality of members, it is possible to easily bring the scraper into a desired curved state by arranging the plurality of members such as cylindrical bodies in accordance with the degree of curve.

An adhesive removing device according to a fifth aspect of the present disclosure is the adhesive removing device according to the second aspect, including an adhesive layer receiving portion configured to receive the adhesive layer scraped by the scraping member.

According to this aspect, since the adhesive layer receiving portion that receives the adhesive layer scraped by the scraping member is provided, the scraped adhesive layer can be easily collected.

An adhesive removing device according to a sixth aspect of the present disclosure is the adhesive removing device according to the second aspect, wherein the scraping member is a scraper having a plate shape, and a portion of the scraper configured to make contact with the belt for scraping is formed into a protruding curve shape.

According to this aspect, the portion of the scraper that performs scraping in contact with the belt is formed into the protruding curve shape. That is, the contact position of the scraping portion of the scraper with respect to the belt changes along the protruding curve shape. Thus, the scraping of the adhesive layer starts at the top position of the protruding curve shape, and the scraping position expands along the protruding curve shape, so that the adhesive layer can be scraped without difficulty.

An adhesive removing device according to a seventh aspect of the present disclosure is the adhesive removing device according to the third aspect, including a position adjustment portion configured to vertically adjust a position of a portion of the scraper configured to make contact with the belt for scraping.

According to this aspect, the position of the portion of the scraper that performs scraping in contact with the belt can be vertically adjusted by the position adjustment portion. Accordingly, the rigidity of the scraper can be easily adjusted, and thus the support state of the scraping member can be easily changed.

An adhesive removing device according to an eighth aspect of the present disclosure is the adhesive removing device according to the second aspect, including a rail extending in a width direction of the belt, wherein the support portion is configured to move along the rail.

According to this aspect, the rail extending in the width direction of the belt is provided, and the support portion is configured to move along the rail. Thus, by moving the support portion along the rail, the scraping can be easily performed over the entire width of the belt.

A recording device according to a ninth aspect of the present disclosure includes a belt including a front surface to which an adhesive layer adheres, the belt being configured to transport a medium, a recording unit configured to perform recording on the medium transported by the belt, and an adhesive removing device configured to remove the adhesive layer from the front surface of the belt, wherein the adhesive removing device is the adhesive removing device according to any one of the first to eighth aspects.

According to this aspect, the same effect as that of any of the first to eighth aspects can be obtained as the recording device.

EMBODIMENTS

Hereinafter, an adhesive removing device according to each embodiment of the present disclosure and a recording device such as an inkjet printer including this adhesive removing device will be specifically described with reference to the drawings.

Description will be made with reference to the drawings in which three axes perpendicular to each other are set as the X-axis, the Y-axis, and the Z-axis. Directions indicated by arrows of the three axes (X, Y, and Z) are + directions of the respective directions, and opposite directions are − directions. The Z-axis direction corresponds to a vertical direction, that is, a direction in which gravity acts. The +Z direction indicates a vertical upward direction, and the −Z direction indicates a vertical downward direction. The X-axis direction and the Y-axis direction correspond to horizontal directions. The +Y direction indicates a front direction of the device, and the −Y direction indicates a rear direction of the device. The +X direction indicates a right direction of the device, and the −X direction indicates a left direction of the device.

First Embodiment

Recording Device

A recording device 1 according to the first embodiment is an inkjet printer.

Figure 2:
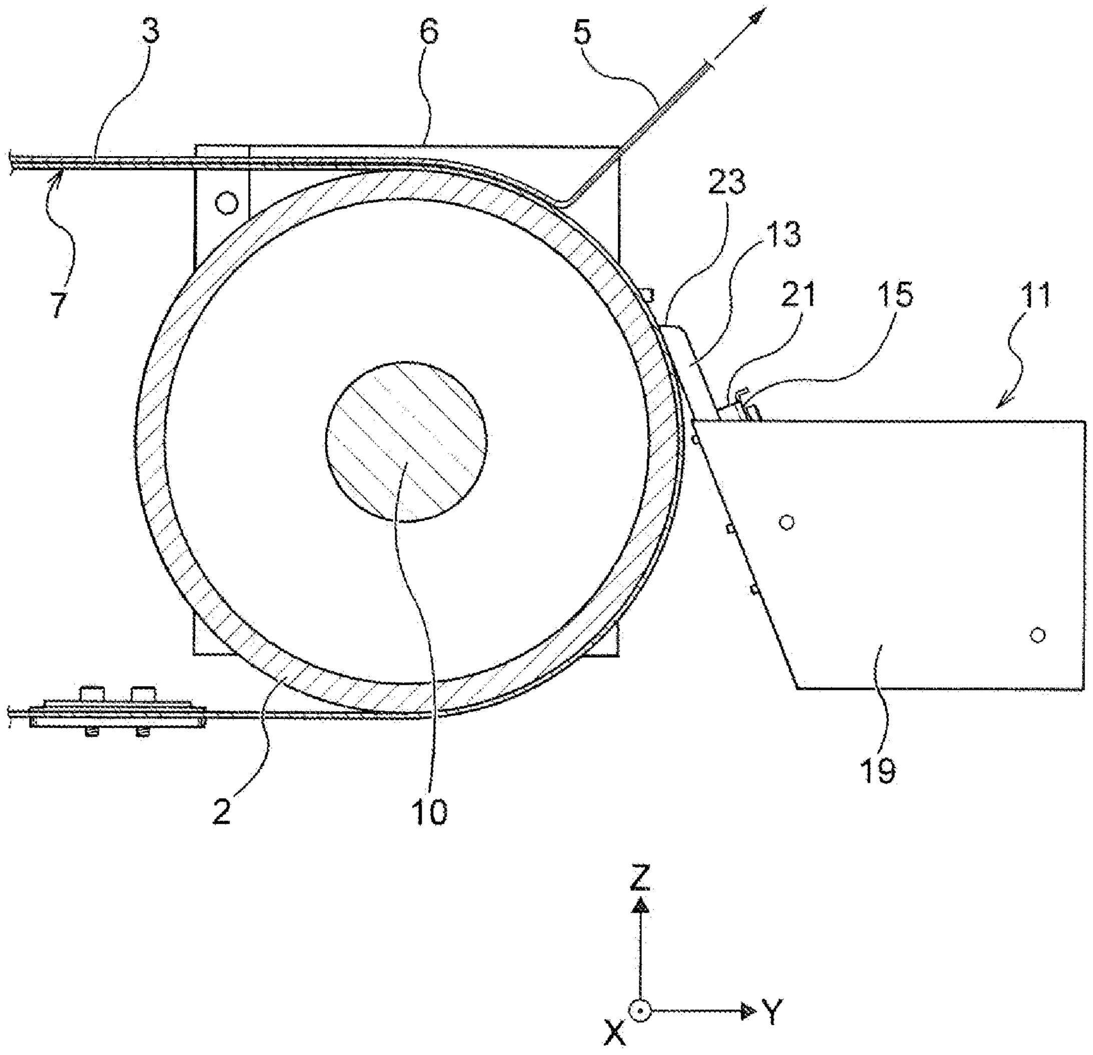
FIG. 2 is a schematic side view of the main parts of the recording device according to the first embodiment.
Figure 3:
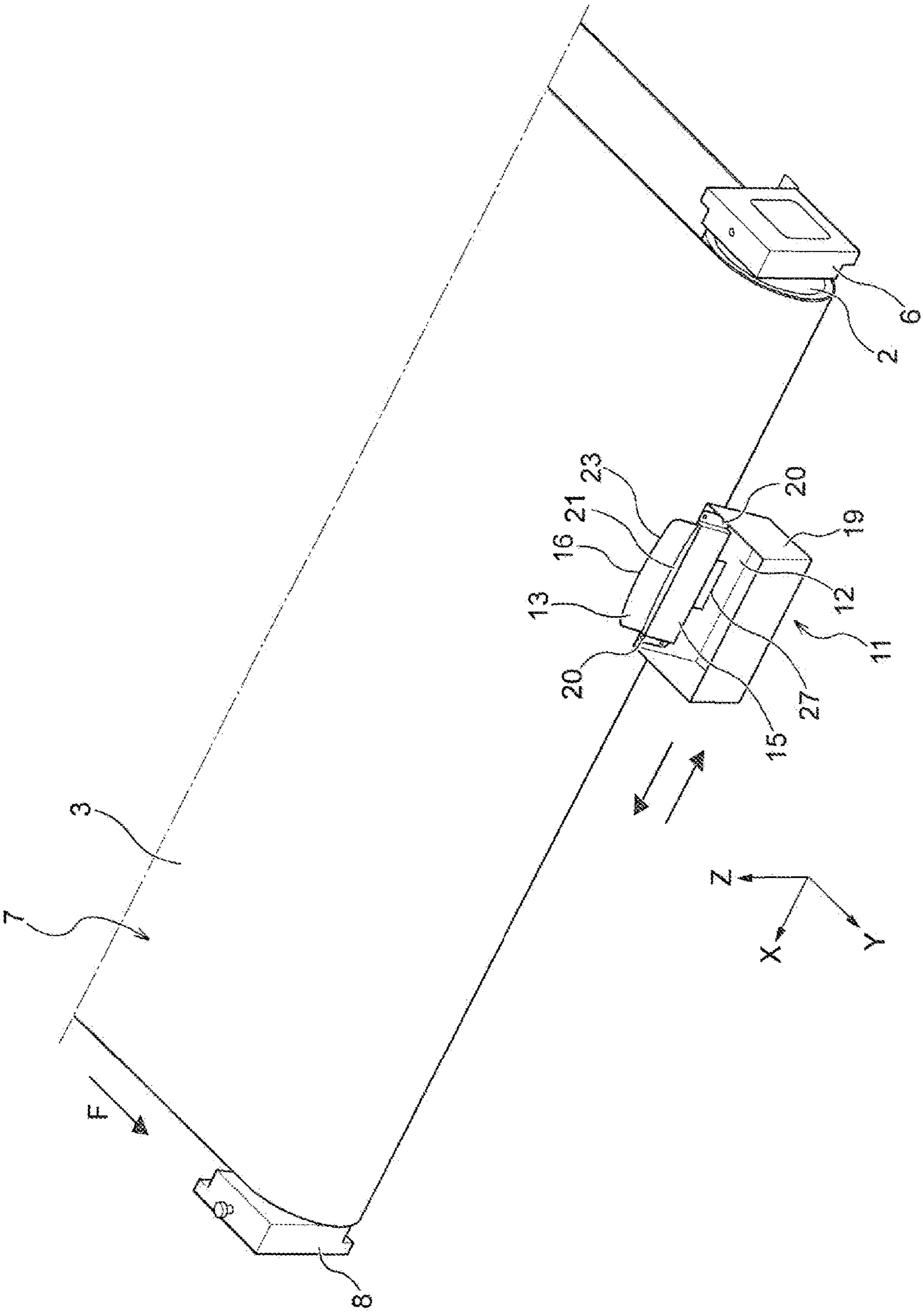
FIG. 3 is a schematic perspective view of the main parts of the recording device according to the first embodiment.

As illustrated in FIGS. 1 to 3, the recording device 1 includes a belt 7 including a front surface to which an adhesive layer 3 adheres and transporting a medium 5 (FIG. 2), and a recording unit 9 performing recording on the medium 5 transported with the medium 5 sticking to the adhesive layer 3 on the front surface of the belt 7. The belt 7 is an endless belt and is wound around a first roller 2 (FIG. 2) located at one end in a transport direction F and a second roller located at another end in the transport direction F (located at a position in the −Y direction in FIG. 1, which is not illustrated in FIG. 1) so as to rotate therearound. The medium 5 comes into contact with the front surface of the belt 7 by passing under a pressing member (not illustrated) upstream in the transport direction F (−Y direction) of the belt 7 and is transported in a state of sticking to the adhesive layer 3. The medium 5 sticking to the adhesive layer 3 passes through a record performing region 4 (FIG. 1) of the recording unit 9, and recording is performed on the medium 5.

As illustrated in FIG. 2, the medium 5 that has passed through the recording unit 9 is peeled off from the adhesive layer 3 at a part of the first roller 2 and wound by a winding portion (not illustrated). That is, the medium 5 is peeled off from the adhesive layer 3 at the part of the first roller 2 and wound by receiving a winding force from the winding portion. In FIGS. 2 and 3, reference numerals 6 and 8 denote bearings of the first roller 2, and a reference numeral 10 denotes a rotation shaft of the first roller 2.

Adhesive Removing Device

As illustrated in FIG. 1, the recording device 1 includes an adhesive removing device 11 that removes the adhesive layer 3 from the front surface of the belt 7. As illustrated in FIGS. 2 and 3, the adhesive removing device 11 is provided at a place where the rear surface of the belt 7 is in contact with the first roller 2.

In the first embodiment, the adhesive removing device 11 includes a scraping member 13 that scrapes the adhesive layer 3 adhering to the front surface of the belt 7 that transports the medium 5, which is a transport target object, and a support portion 15 that supports the scraping member 13. The support portion 15 is configured to support the scraping member 13 such that a support state of the scraping member 13 is changeable.

Here, the expression "scrapes the adhesive layer 3" means that the belt 7 moves in the transport direction F relative to the scraping member 13 in a state in which the scraping member 13 is in contact with the adhesive layer 3 adhering to the front surface of the belt 7, so that the adhesive layer 3 is removed so as to be scraped off the front surface of the belt 7.

In addition, a specific structure in which the support portion 15 supports the scraping member 13 such that the support state of the scraping member 13 is changeable will be described below.

As illustrated in FIG. 1, the adhesive removing device 11 includes a rail 17 extending in the width direction of the belt 7 (X-axis direction). The support portion 15 is provided movably in the width direction of the belt 7 (X-axis direction) along the rail 17.

The adhesive removing device 11 further includes a box-shaped adhesive layer receiving portion 19 for receiving the adhesive layer 3 scraped by the scraping member 13.

Figure 4:
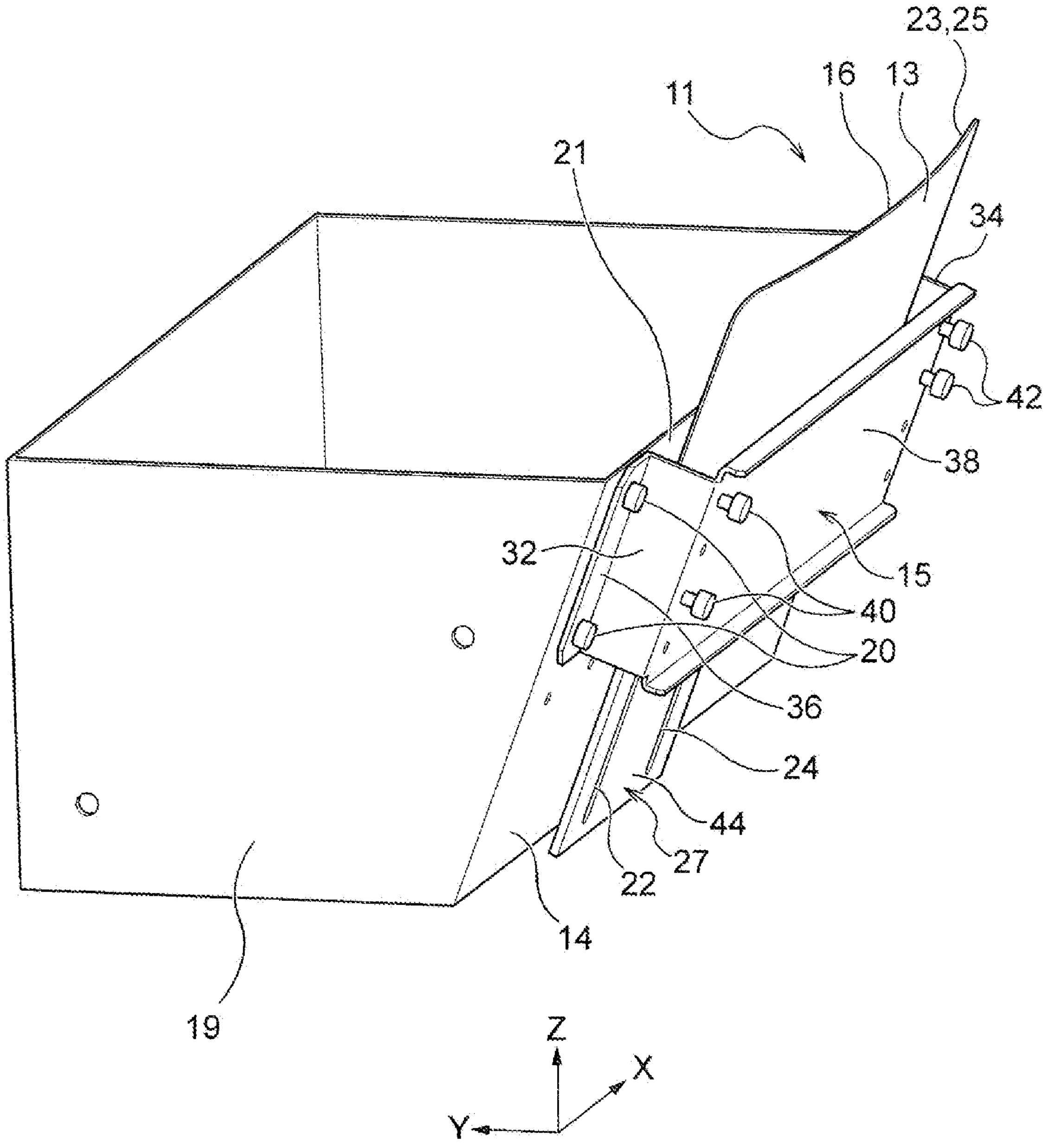
FIG. 4 is a schematic perspective view of main parts of the adhesive removing device according to the first embodiment.
Figure 5:
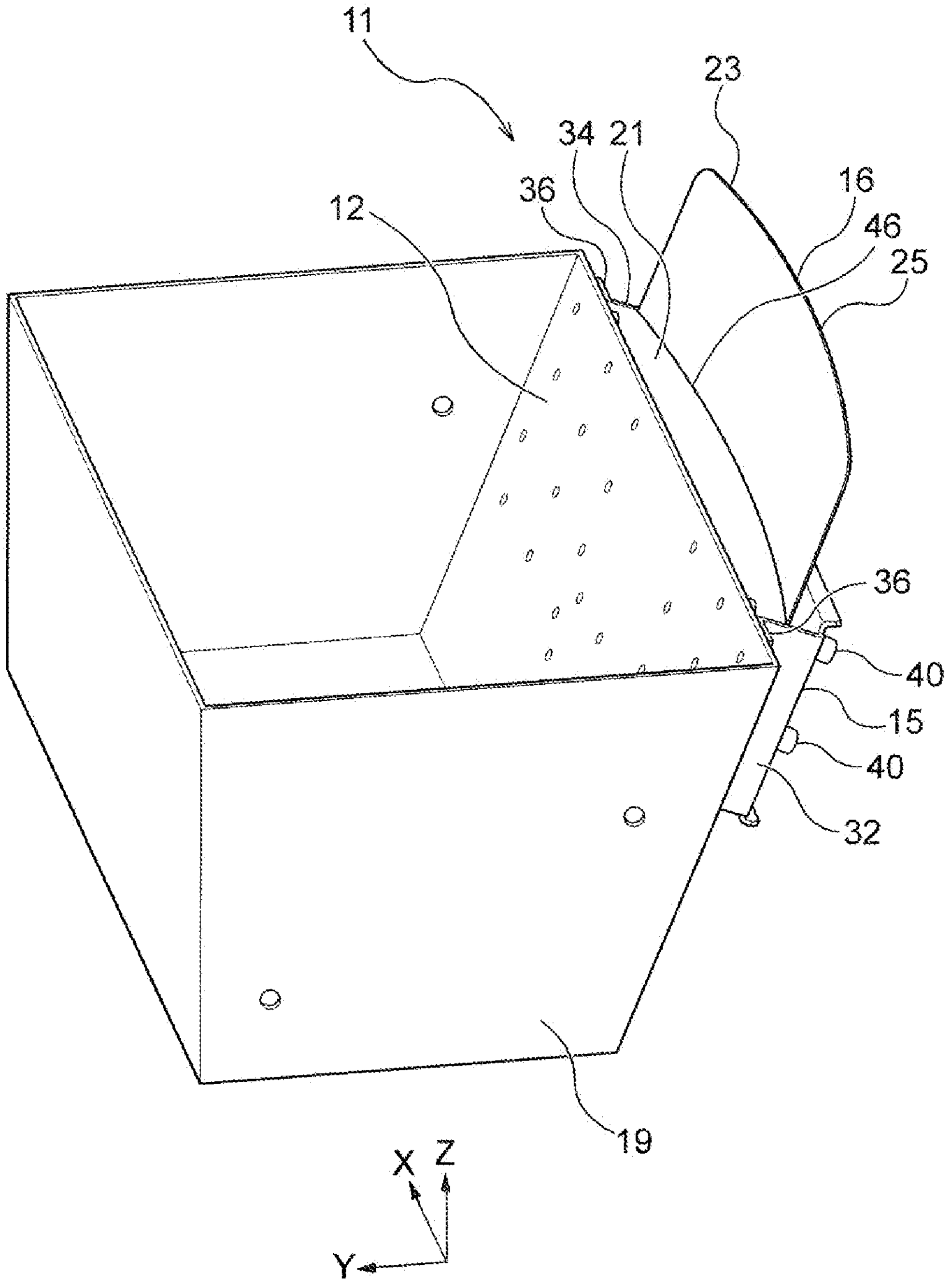
FIG. 5 is a schematic perspective view of the main parts viewed from a direction different from that of FIG. 4.

As illustrated in FIGS. 2 and 3, in the first embodiment, the support portion 15 is fixed to an inner surface 12 of the adhesive layer receiving portion 19 with screws 20. As illustrated in FIGS. 4 and 5, the support portion 15 may be fixed to an outer surface 14 of the adhesive layer receiving portion 19 with the screws 20. Here, the support portion 15 of FIGS. 2 and 3 and the support portion of FIGS. 4 and 5 have the same structure. The specific structure of the support portion 15 will be described below in detail with reference to FIGS. 4 to 7.

In the case of a structure in which the support portion 15 is fixed to the outer surface 14 of the adhesive layer receiving portion 19, the adhesive layer 3 scraped by the scraping member 13 is less likely to enter the adhesive layer receiving portion 19 than in the case where the support portion 15 is fixed to the inner surface 12 as illustrated in FIG. 3. Thus, a guide member may be provided that makes it easy for the adhesive layer 3 scraped by the scraping member 13 to enter the adhesive layer receiving portion 19.

In the first embodiment, the adhesive layer receiving portion 19 is configured to be movable in the width direction of the belt 7 (X-axis direction) along the rail 17. Although a structure is employed in which the adhesive layer receiving portion 19 is manually moved along the rail 17, the adhesive layer receiving portion 19 may be configured to be movable by means of a driving mechanism (not illustrated) transmitting power of a driving source such as a motor using a power transmission mechanism.

In the first embodiment, since the support portion 15 supporting the scraping member 13 is fixed to the inner surface 12 (FIGS. 2 and 3) or the outer surface 14 (FIGS. 4 and 5) of the adhesive layer receiving portion 19, moving the adhesive layer receiving portion 19 along the rail 17 also moves the scraping member 13 and the support portion 15 together with the adhesive layer receiving portion 19 along the rail 17.

In addition, the support portion 15 may have a structure of moving directly along the rail 17 without interposing the adhesive layer receiving portion 19 therebetween.

In the first embodiment, both ends of the rail 17 are coupled to a structural member (not illustrated) holding the bearings 6 and 8 via coupling members (not illustrated) and the rail 17 can be mounted at a predetermined position with respect to the belt 7. As a result, the adhesive removing device 11 can scrape and remove the adhesive layer 3 of the belt 7. When the adhesive removing device 11 is not in use, the coupling members can be removed from the structural member, so that the adhesive removing device 11 can be removed from the recording device 1. As a result, the adhesive removing device 11 can be kept at another place.

When the adhesive removing device 11 does not interfere with use of the recording device 1 in a state in which the adhesive removing device 11 is coupled to the recording device 1, it is needless to say that the adhesive removing device 11 may remain coupled.

Further, the "predetermined position" of the rail 17 with respect to the belt 7 may not be a fixed position but may be a variable position. The scraping member 13 may be also supported by the support portion 15 such that the contact angle with respect to the belt 7 is changeable.

In addition, it is needless to say that the structure in which the adhesive removing device 11 can scrape and remove the adhesive layer 3 of the belt 7 is not limited to the structure in which the adhesive removing device 11 is mounted along the structural member via the coupling members. For example, leg portions may be provided at both end portions of the rail 17 so as to enable the adhesive layer 3 of the belt 7 to be scraped and removed with the leg portions fixed to a floor or the like.

In the first embodiment, as a specific structure capable of changing the support state of the scraping member 13, the support portion 15 is configured to support a different type of scraping member 13 in a replaceable manner.

The different type of scraping member 13 means that the scraping member 13 is replaced with another one different in the shape, thickness, material, and the like in accordance with the type of the adhesive and the deterioration state of the adhesive layer 3 so that the adhesive layer 3 can be scraped with efficient scraping performance.

The structure capable of changing the support state of the scraping member 13 is not limited to the above-described structure capable of replacing the scraping member 13 with a different type of scraping member 13. For example, a structure in which the contact angle of the scraping member 13 supported by the support portion 15 with respect to the belt 7 is variable or a structure in which the protruding length of the scraping member 13 from the support portion 15 is variable may be employed.

In the first embodiment, the scraping member 13 includes a plate-shaped scraper 13 (denoted by the same reference numeral 13). Further, as illustrated in FIGS. 2 and 3, the adhesive removing device 11 includes a curve forming portion 21 that curves the scraper 13 so as to protrude toward the belt 7 when the plate-shaped scraper 13 is supported by the support portion 15.

Further, in the scraper 13, a portion 23 that performs scraping in contact with the belt 7 is formed into a protruding curve shape 25. The protruding curve shape 25 is formed such that a central portion in the width direction (X-axis direction) of the portion 23 that performs scraping in contact with the belt 7 protrudes most, in other words, the central portion is formed at a top position 16. The scraper 13 starts scraping the adhesive layer 3 of the belt 7 from the top position 16, and the scraping position expands along the protruding curve shape 25.

The specific structure in which the support portion 15 supports the scraper 13 via the curve forming portion 21 is drawn small in FIG. 3. Thus, this specific structure, inclusive of a position adjustment portion 27 described below, will be described again in detail with reference to FIGS. 4 to 7, in which the specific structure is drawn large.

Figure 8A:
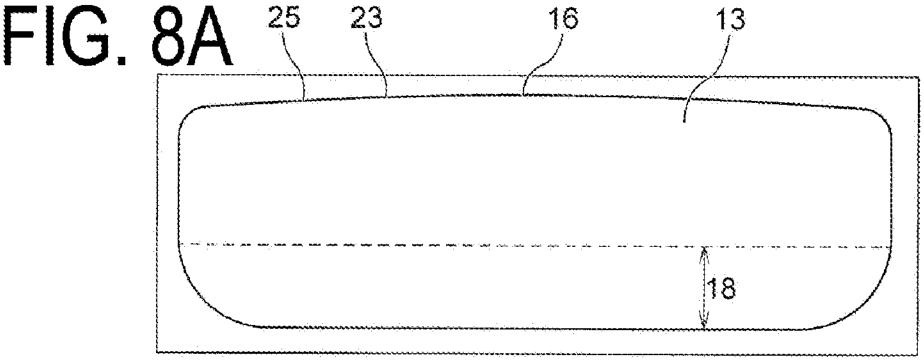
FIGS. 8A-8C are front views of a scraper according to the first embodiment.
Figure 8B:
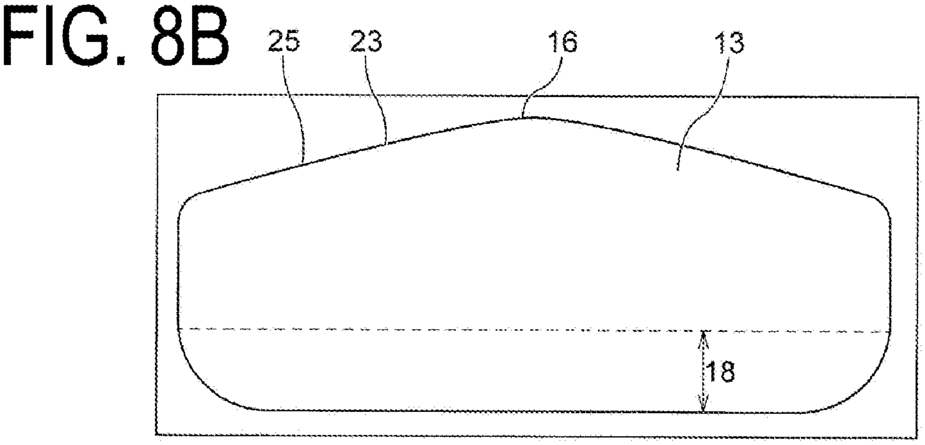
Figure 8C:
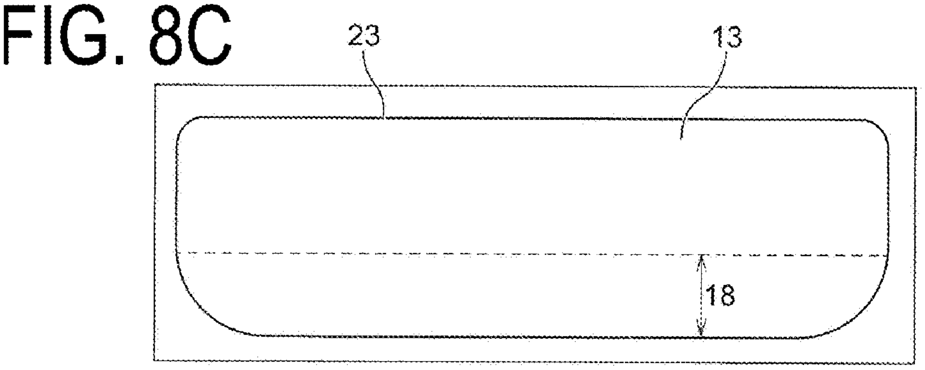

Examples of the scraper 13 having different shapes will be described with reference to FIGS. 8A, 8B, and 8C. FIG. 8A illustrates an example in which the central portion 16 of the scraping portion 23 has a protruding curve shape slightly higher than a linear shape, FIG. 8B illustrates an example in which the central portion 16 of the scraping portion 23 has a protruding curve shape higher than that of FIG. 8A. FIG. 8C illustrates an example in which the entire scraping portion 23 has a linear shape. At the top position 16 of the scraper 13 of FIG. 8B, the contact force to the belt 7 is concentrated on a smaller area than that of the top position 16 of the scraper 13 of FIG. 8A. As a result, a larger scraping force than that in FIG. 8A acts. It was confirmed that use of the scraper 13 of FIG. 8B tended to be better when the degree of deterioration of the adhesive layer 3 was low. On the other hand, it was confirmed that when the degree of deterioration of the adhesive layer 3 was high and the adhesive layer 3 was partially peeled off, use of the scraper 13 of FIG. 8C tended to be better.

In FIG. 8A, FIG. 8B, and FIG. 8C, a partial region 18 opposite to the scraping portion 23 of the scraper 13 is in surface contact with the curve forming portion 21 and is supported by the support portion 15.

In the first embodiment, as illustrated in FIG. 3, the adhesive removing device 11 includes the position adjustment portion 27. The position adjustment portion 27 can vertically adjust the position of the portion 23 of the scraper 13 that performs scraping in contact with the belt 7.

Next, a specific structure in which the support portion 15 supports the scraper 13 via the curve forming portion 21, inclusive of the structure of the position adjustment portion 27, will be described with reference to FIGS. 4 to 7.

As illustrated in FIG. 4, the support portion 15 is formed into a shape including a pair of leg portions 32 and 34 and a base portion 38 by bending a long plate into a substantially U shape. In the support portion 15, foot portions 36 and 36 of the leg portions 32 and 34 are fastened and fixed to the outer surface 14 of the adhesive layer receiving portion 19 with the screws 20.

As illustrated in FIGS. 4 and 5, the curve forming portion 21 is located between the plate-shaped scraper 13 and the outer surface 14 of the adhesive layer receiving portion 19, and the scraper 13 comes into contact with a curve forming surface 46 of the curve forming portion 21, so that the scraper 13, which is deformed into a curve shape that protrudes in the −Y direction, is supported by the support portion 15.

Push-in screws 40 and 42 are screwed into both ends of the base portion 38 of the support portion 15. The push-in screws 40 and 42 are turned and pushed in, and thus the scraper 13 is curved and deformed so as to come into contact with the curve forming surface 46 of the curve forming portion 21. Accordingly, the scraper 13 is deformed into a curve shape that protrudes in the −Y direction, and the scraper 13 in the curve shape is supported by the support portion 15.

As illustrated in FIGS. 4 and 5, the position adjustment portion 27 is formed by bending a plate member into an L shape, and includes a slide portion 44 and a placement portion 28. The slide portion 44 is held by a holding portion 30 so as to be vertically slidable at the position.

Figure 6:
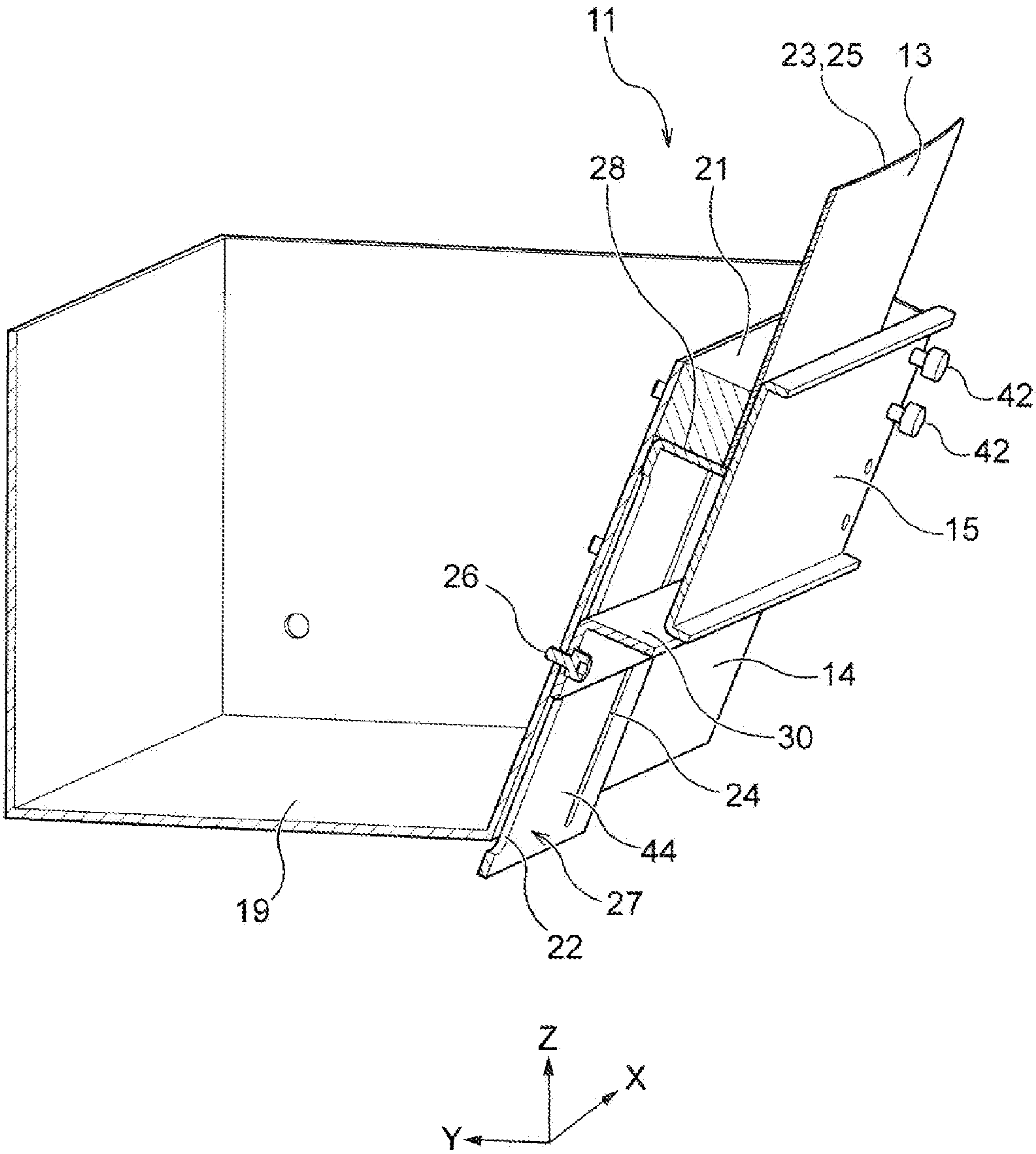
FIG. 6 is a side cross-sectional perspective view of FIG. 4.

As illustrated in FIG. 6, the slide portion 44 includes two parallel guide slits 22 and 24 that are vertically long (Z-axis direction). Screws 26 are attached to the outer surface 14 of the adhesive layer receiving portion 19 so as to pass through the guide slits 22 and 24 from a direction where the holding portion 30 is provided. That is, the slide portion 44 is configured to be vertically slidable by the screws 26 and the guide slits 22 and 24.

Figure 7:
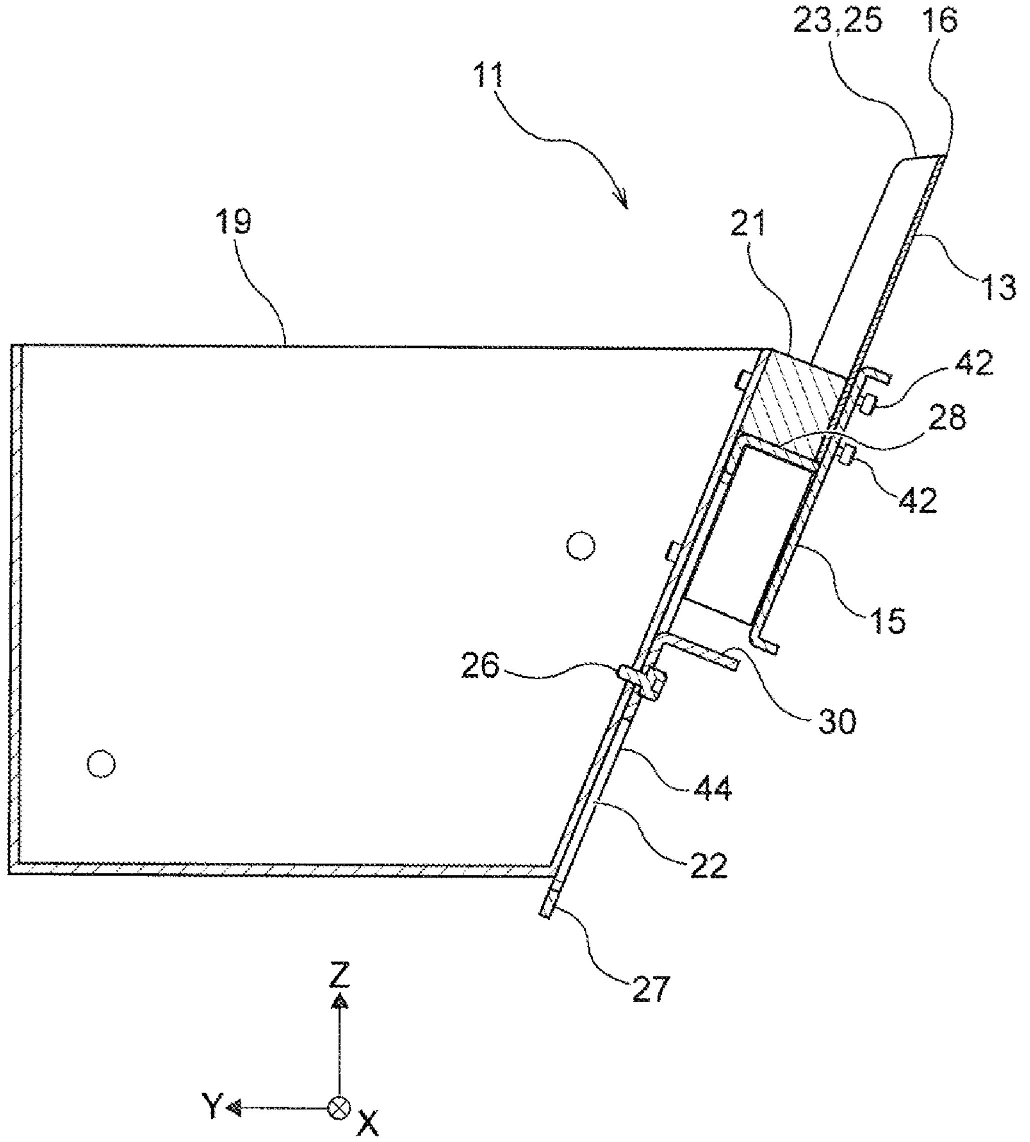
FIG. 7 is a side cross-sectional view of FIG. 4.

As illustrated in FIGS. 6 and 7, the lower side of the scraper 13 comes into contact with the placement portion 28, so that the scraper 13 is placed on the placement portion 28. The slide portion 44 of the position adjustment portion 27 is moved vertically, so that the placement portion 28 is also integrally moved vertically. As a result, the position of the portion 23 of the scraper 13 that performs scraping in contact with the belt 7 can be vertically moved and adjusted.

In a case where the contact angle of the scraper 13 with respect to the belt 7 is configured to be variable, the angle can be adjusted to an appropriate angle when the position of the scraping portion 23 of the scraper 13 is vertically moved and adjusted.

Description of Effects of First Embodiment (1) In the first embodiment, the support portion 15 that supports the scraping member 13 supports the scraping member 13 such that the support state of the scraping member 13 is changeable. Thus, since the support state of the scraping member 13 can be changed, the change can be performed according to the type of the adhesive and the deterioration state of the adhesive layer 3, which enables the adhesive layer 3 to be scraped with efficient scraping performance.

(2) Further, in the first embodiment, the support portion 15 supports a different type of scraping member 13 in a replaceable manner. Thus, the support state of the scraping member 13 can be easily changed by replacing the scraping member 13 with the different type of scraping member 13.

(3) Further, in the first embodiment, the curve forming portion 21 curves the plate-shaped scraper 13 having low rigidity, thereby easily enabling the rigidity to increase. This enables the scraper 13, which has low rigidity in a non-curved state, to be pressed against and brought into firm contact with the belt 7 in a state where the scraper 13 is curved to have increased rigidity. Thus, it is possible to scrape the adhesive layer 3 in a state where the belt 7 is less likely to be damaged.

(4) In addition, in the first embodiment, since the adhesive layer receiving portion 19 that receives the adhesive layer 3 scraped by the scraping member 13 is provided, the scraped adhesive layer 3 can be easily collected.

(5) Further, in the first embodiment, the portion 23 of the scraper 13 that performs scraping in contact with the belt 7 is formed into the protruding curve shape 25. That is, the contact position of the scraping portion 23 of the scraper 13 with respect to the belt 7 changes along the protruding curve shape 25. Thus, the scraping of the adhesive layer 3 starts at the top position 16 of the protruding curve shape 25, and the scraping position expands along the protruding curve shape 25, so that the adhesive layer 3 can be scraped without difficulty.

(6) In the first embodiment, the position of the portion 23 of the scraper 13 that performs scraping in contact with the belt 7 can be vertically adjusted by the position adjustment portion 27. Accordingly, the rigidity of the scraper 13 can be easily adjusted, and thus the support state of the scraping member 13 can be easily changed.

(7) Further, in the first embodiment, the rail 17 extending in the width direction of the belt 7 is provided, and the support portion 15 is movable along the rail 17. Thus, by moving the support portion 15 along the rail 17, the scraping can be easily performed over the entire width of the belt 7.

Second Embodiment

Figure 9:
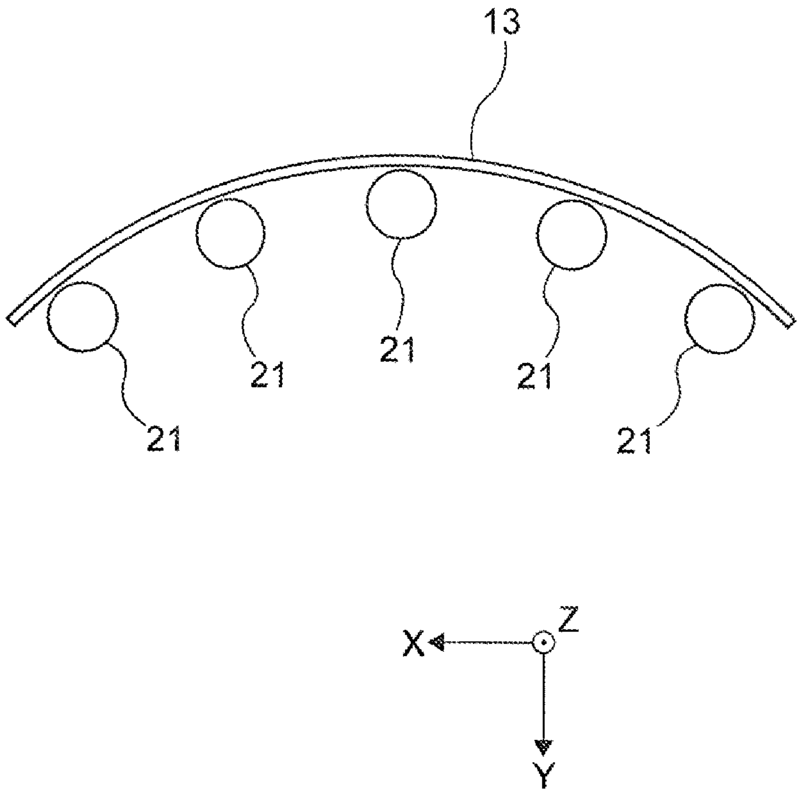
FIG. 9 is a plan view of main parts of a curve forming portion according to a second embodiment.

Next, an adhesive removing device 11 according to a second embodiment will be described with reference to FIG. 9. The same parts as those in the first embodiment are designated by the same reference numerals, and description of the configurations and the effects will be omitted.

A curve forming portion 21 of the adhesive removing device 11 of the second embodiment is not a single body as in the first embodiment, but includes a plurality of members. Specifically, the five curve forming portions 21 having a cylindrical shape are arranged separately from each other and are configured such that the scraper 13 is curved by all of the five curve forming portions 21. It is needless to say that the plurality of members are not limited to those having a cylindrical shape and may have any structure as long as the scraper 13 can be curved by all of the plurality of members.

According to the second embodiment, the curve forming portion 21 includes the plurality of members. That is, since the plurality of members having a cylindrical shape or the like can be arranged in accordance with the degree of curve of the scraper 13, the scraper 13 can be easily brought into a desired curved state.

OTHER EMBODIMENTS

The adhesive removing device 11 and the recording device 1 including the adhesive removing device 11 according to the present disclosure is based on the configurations of the embodiments described above. However, as a matter of course, modifications, omission, and the like may be made to a partial configuration without departing from the gist of the disclosure of the present application.

In the above-described embodiments, the recording device 1 has been described as a device including the adhesive removing device. However, devices other than the recording device may include the adhesive removing device. That is, the present disclosure is also applicable to other devices having a structure of transporting the medium 5 with the medium 5 sticking to the adhesive layer 3 of the belt 7.

In the above-described embodiments, the case where the support portion 15 supports one scraper 13 has been described. However, the support state of the scraper 13 may be changed by the support portion 15 supporting two or more scrapers in an overlapping manner.

What is claimed is:

1. An adhesive removing device comprising:

a scraping member configured to scrape an adhesive layer adhering to a front surface of a belt configured to transport a transport target object so as remove the adhesive layer from the front surface of the belt;

a support portion configured to support the scraping member, the support portion being configured to support the scraping member such that a support state of the scraping member is changeable; and a rail extending in a width direction of the belt, wherein the support portion is configured to move along the rail.

2. The adhesive removing device according to claim 1, wherein the support portion is configured to support different types of the scraping members in a replaceable manner.

3. The adhesive removing device according to claim 2, wherein the scraping member is a scraper having a plate shape, and the adhesive removing device includes a curve forming portion configured to curve the scraper when the scraper is supported by the support portion.

4. The adhesive removing device according to claim 3, wherein the curve forming portion includes a plurality of members.

5. The adhesive removing device according to claim 3, comprising a position adjustment portion configured to vertically adjust a position of a portion of the scraper configured to make contact with the belt for scraping.

6. The adhesive removing device according to claim 2, comprising an adhesive receiving portion configured to receive the adhesive scraped by the scraping member.

7. The adhesive removing device according to claim 2, wherein the scraping member is a scraper having a plate shape, and a portion of the scraper configured to make contact with the belt for scraping is formed into a protruding curve shape.

8. A recording device comprising:

a belt including a front surface to which an adhesive layer adheres, the belt being configured to transport a medium;

a recording unit configured to perform recording on the medium transported by the belt; and an adhesive removing device configured to remove the adhesive layer from the front surface of the belt, wherein the adhesive removing device is the adhesive removing device according to claim 1.

* * * * *